(12) United States Patent
Shatoff et al.

(10) Patent No.: US 7,389,748 B2
(45) Date of Patent: Jun. 24, 2008

(54) FOOD DISPENSING INTERLOCKING ANIMAL TOY SYSTEM

(75) Inventors: Alise Shatoff, San Diego, CA (US); Birte Haakansson, Escondido, CA (US)

(73) Assignee: Canine Genius, San Diego, CA (US)

( * ) Notice: Subject to any disclaimer, the term of this patent is extended or adjusted under 35 U.S.C. 154(b) by 0 days.

(21) Appl. No.: 10/811,340

(22) Filed: Mar. 25, 2004

(65) Prior Publication Data
US 2004/0200434 A1 Oct. 14, 2004

Related U.S. Application Data

(60) Provisional application No. 60/457,835, filed on Mar. 25, 2003.

(51) Int. Cl.
*A01K 29/00* (2006.01)
*A63H 29/08* (2006.01)

(52) U.S. Cl. ............... 119/707; 119/709; 119/702; 119/711; 119/710; 119/708; 446/168; 446/124; 446/73; 446/85; 446/424

(58) Field of Classification Search ............... 119/709, 119/707, 702, 711, 710, 708; D30/160; 446/73, 446/76, 120, 121, 124, 486, 125, 168, 126, 446/475, 489, 85, 71, 424; 273/153 R, 156, 273/398, 401, 144 R; 403/291, 223, 225, 403/228; 285/194, 202, 203, 213, 188; 473/518, 473/577, 594
See application file for complete search history.

(56) References Cited

U.S. PATENT DOCUMENTS

| | | | |
|---|---|---|---|
| 1,022,112 A * | 4/1912 | Smith ................... 119/711 |
| 1,534,964 A * | 4/1925 | Kahnweiler ............. 119/711 |
| D256,958 S * | 9/1980 | Markham ............... D30/160 |
| D265,139 S * | 6/1982 | Salvato ................. D30/160 |
| 4,802,944 A * | 2/1989 | Benge ..................... 156/247 |
| 5,343,828 A * | 9/1994 | Houghton et al. ....... 119/51.03 |
| 5,667,419 A * | 9/1997 | Spector ..................... 446/72 |
| 5,758,604 A | 6/1998 | Jorgensen |
| 5,778,825 A * | 7/1998 | Krietzmen et al. ....... 119/708 |
| 5,865,146 A | 2/1999 | Markham |
| 5,865,147 A | 2/1999 | Rubin |
| 5,957,082 A | 9/1999 | Budman et al. |
| 6,000,637 A * | 12/1999 | Duncan ................... 239/526 |
| 6,073,581 A | 6/2000 | Wang |

(Continued)

FOREIGN PATENT DOCUMENTS

| | | | |
|---|---|---|---|
| DE | 29703253 | * | 2/1997 |
| GB | 2231502 | * | 11/1990 |
| JP | 2002119166 | * | 4/2002 |

*Primary Examiner*—Andrea M Valenti
(74) *Attorney, Agent, or Firm*—Sam K. Tahmassebi

(57) ABSTRACT

An animal toy features the ability to connect two or more separate toys of varying shape, size, color, and/or texture, together to create larger and more complex toy systems. The animal toy allows an almost endless variety of toy systems to capture the interest as well as challenge and develop the animal's problem solving skills. The animal toys are either solid or include internal chambers for holding and ultimately dispensing food. When two or more toys with the internal chambers are combined the food may flow from the chamber of one toy into another toy several times before exiting the toy system. The increased problem of extracting the food challenges and develops the animal's skills. Morever, by combining solid and food dispensing toys in random combinations further increases the problem solving skills required to completely extract the food from the toy system.

9 Claims, 14 Drawing Sheets

U.S. PATENT DOCUMENTS

| | | |
|---|---|---|
| 6,148,771 A | 11/2000 | Costello |
| 6,158,391 A | 12/2000 | Simonetti |
| 6,186,096 B1 * | 2/2001 | Miller .................. 119/709 |
| 6,237,538 B1 | 5/2001 | Tsengas |
| 6,264,522 B1 * | 7/2001 | Dickson ................ 446/120 |
| 6,289,846 B1 | 9/2001 | Long |
| 6,427,634 B1 | 8/2002 | Mann |
| 6,439,166 B1 | 8/2002 | Markham |
| 6,557,496 B2 | 5/2003 | Herrenbruck |
| 6,623,328 B1 | 9/2003 | Theel |
| 6,634,318 B1 | 10/2003 | Rucker |
| 6,679,780 B1 * | 1/2004 | Shih .................. 273/157 R |
| 6,688,258 B1 * | 2/2004 | Kolesar ................ 119/710 |
| 7,219,620 B2 * | 5/2007 | Rucker et al. .......... 119/51.12 |
| 2001/0008125 A1 * | 7/2001 | Mann .................. 119/709 |
| 2002/0197933 A1 | 12/2002 | Shea |

* cited by examiner

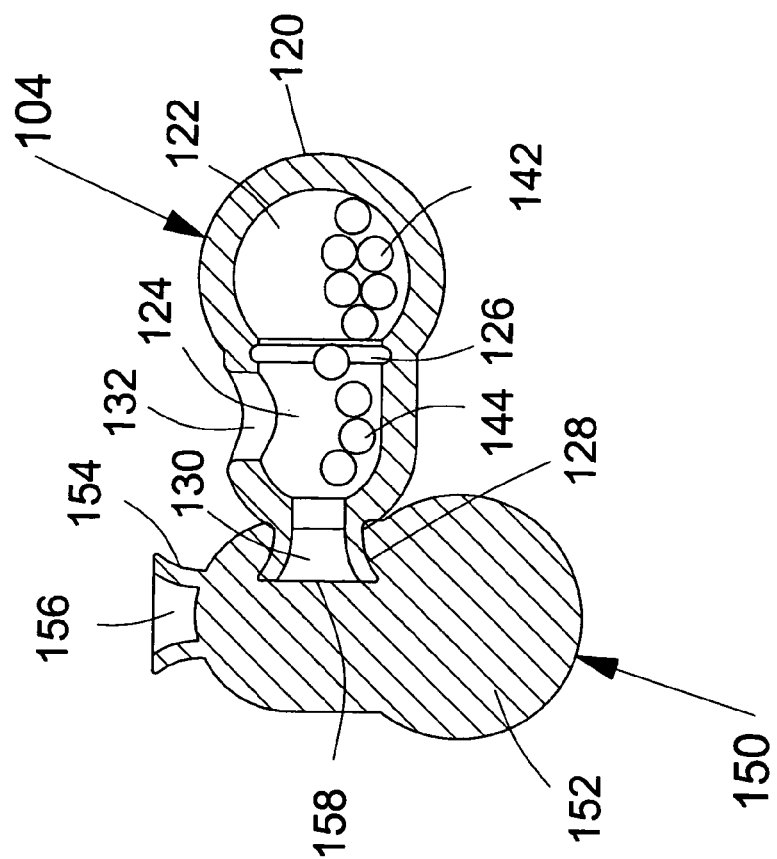
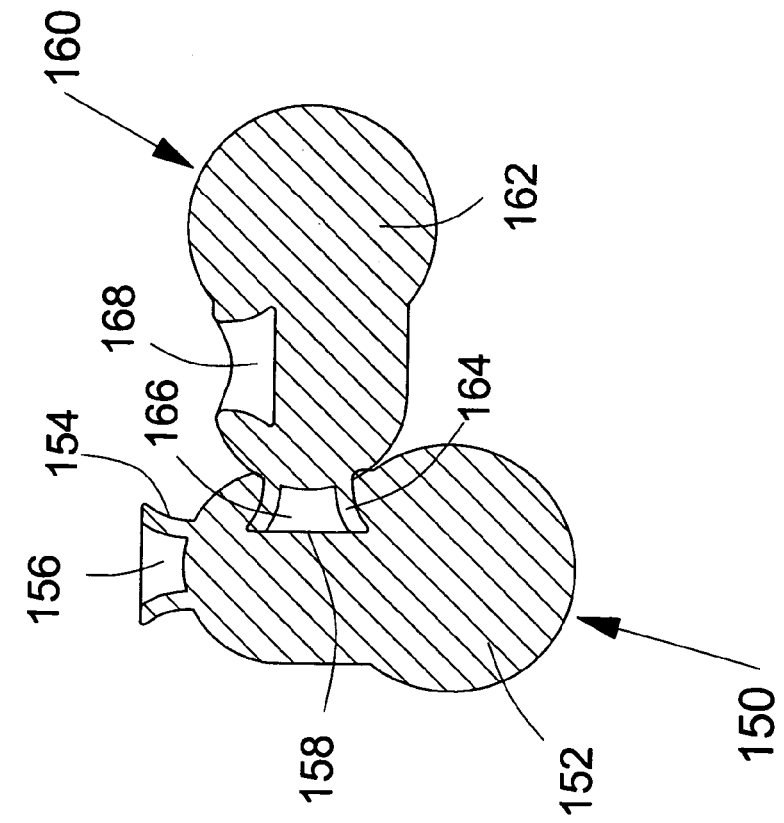

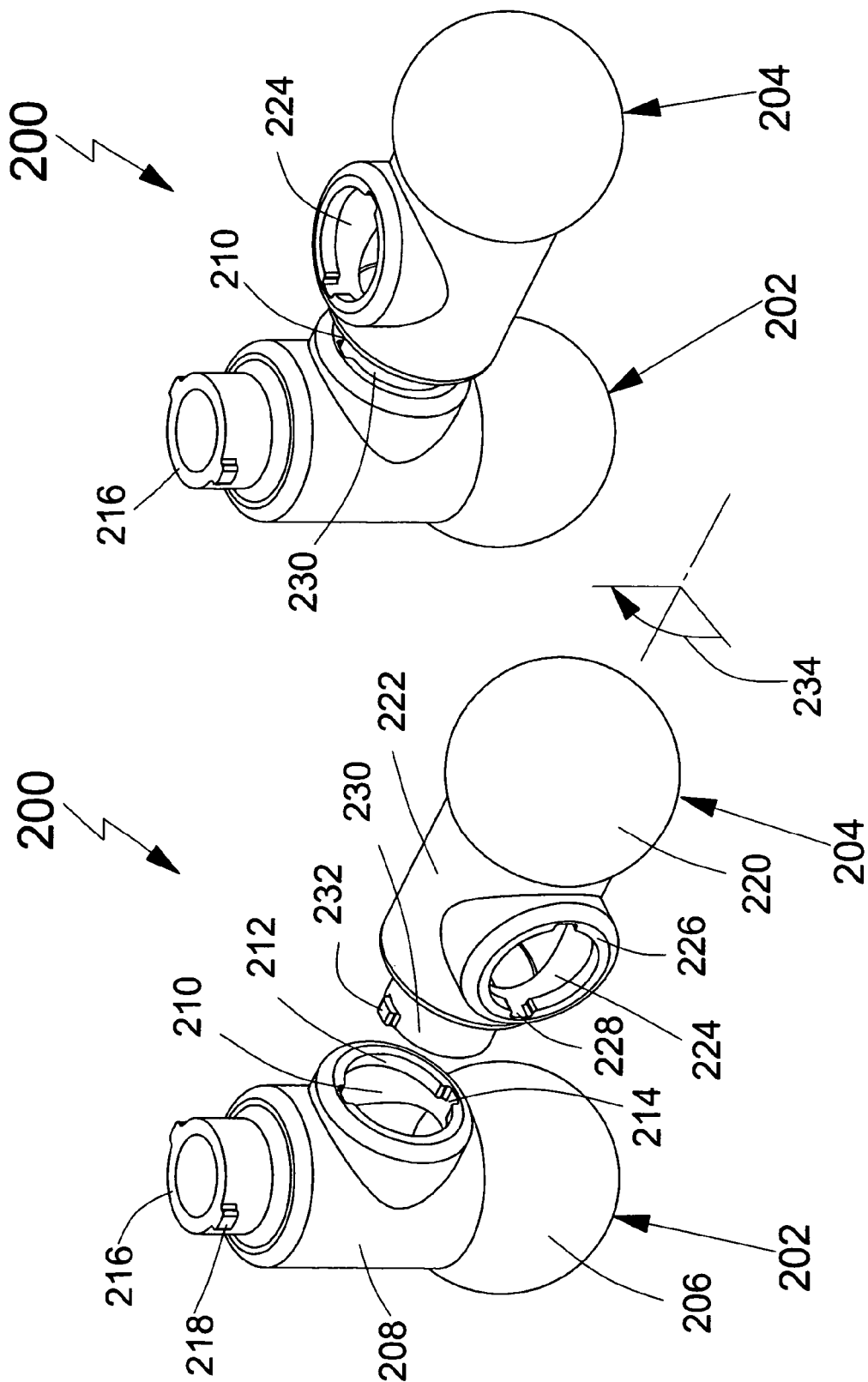

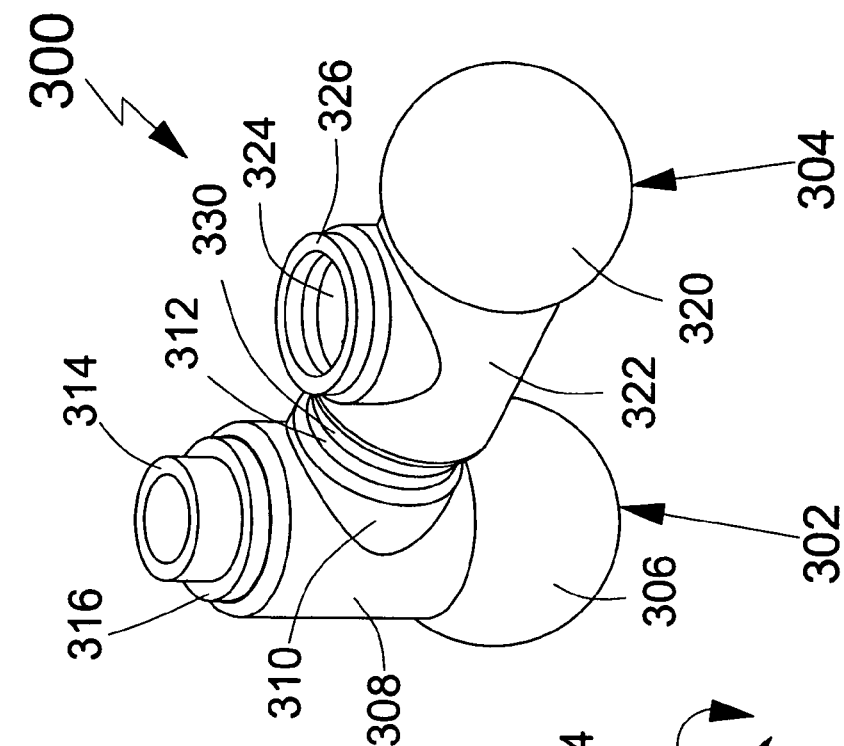
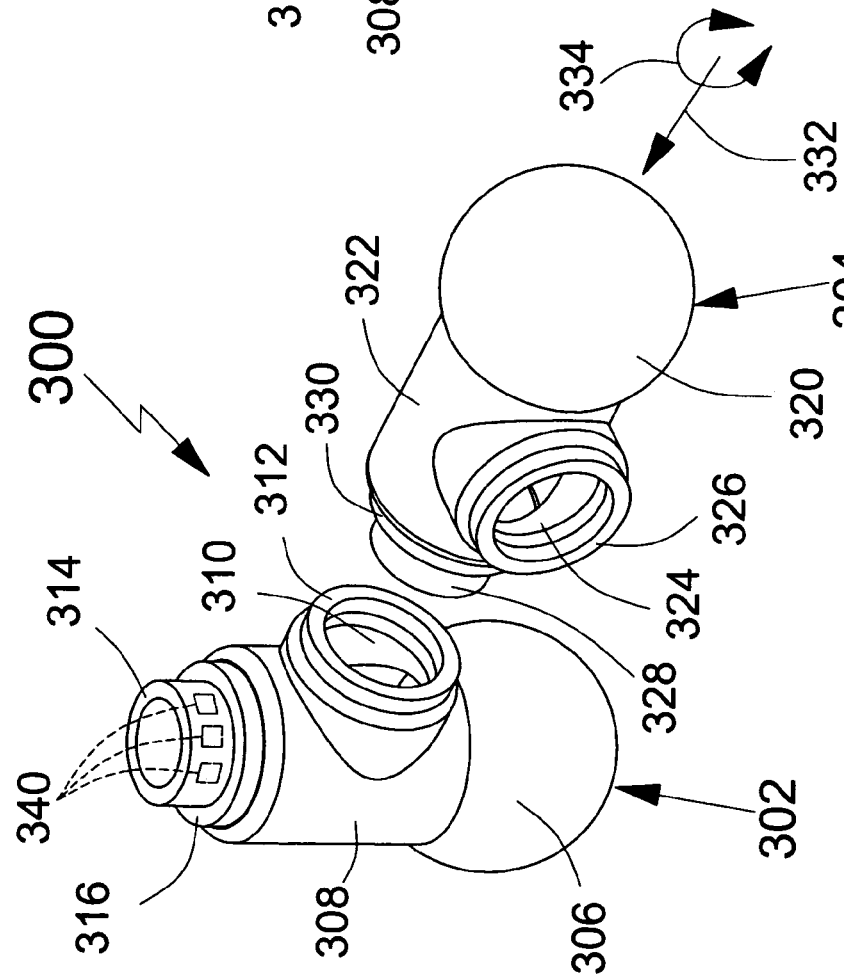
FIG. 5A
FIG. 5B

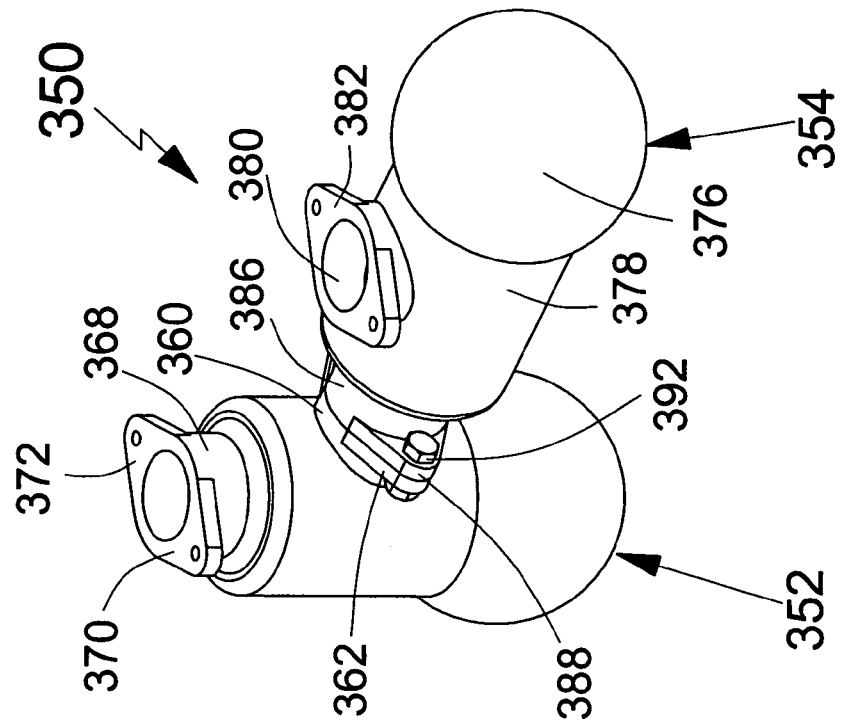
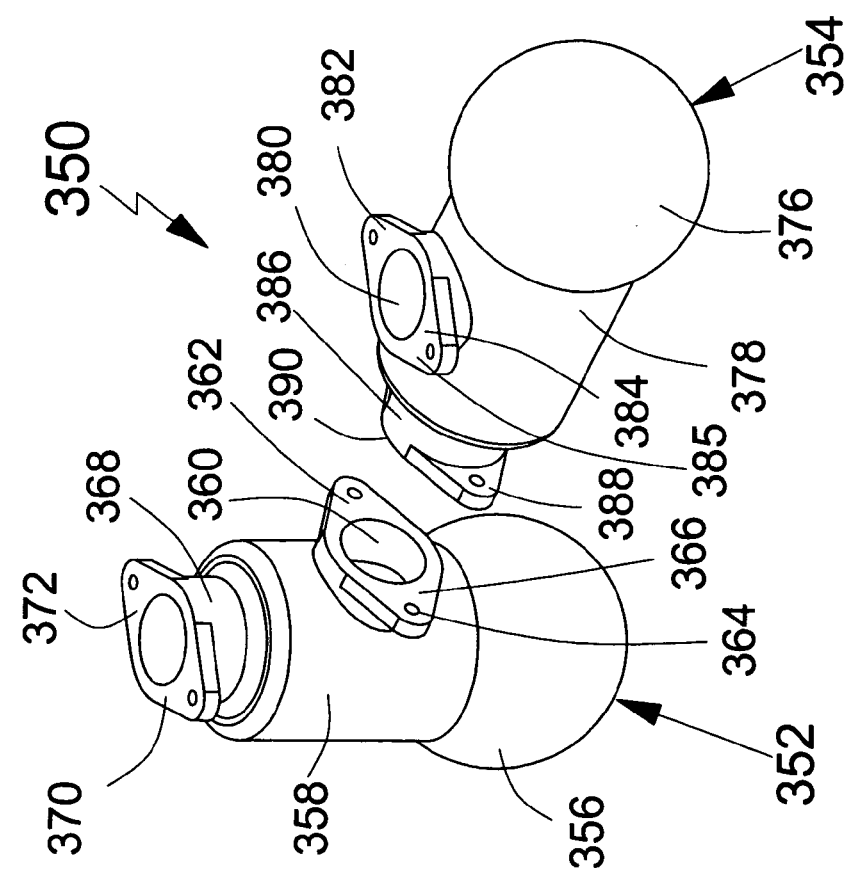
FIG. 6A
FIG. 6B

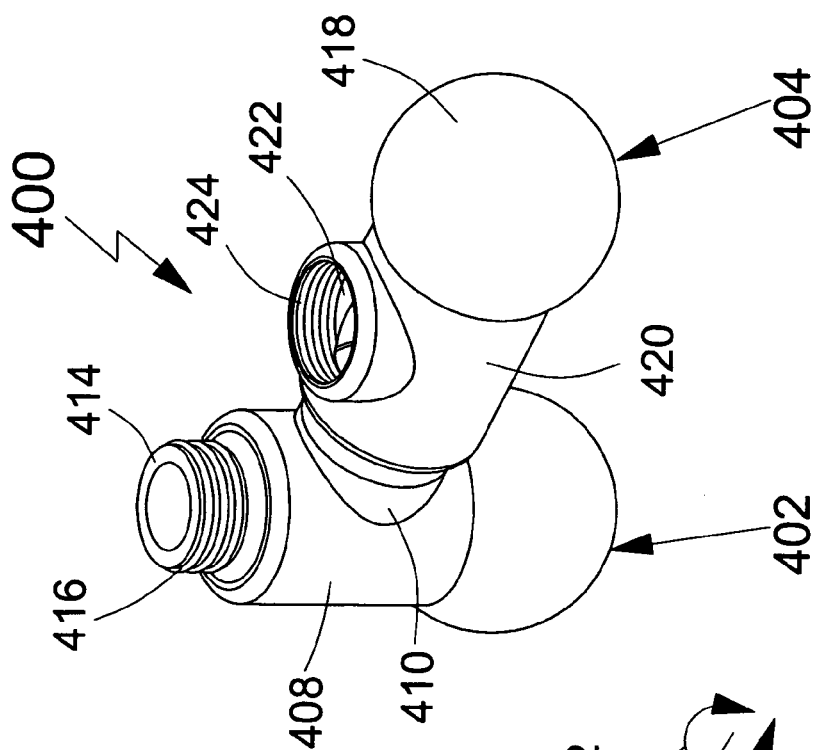
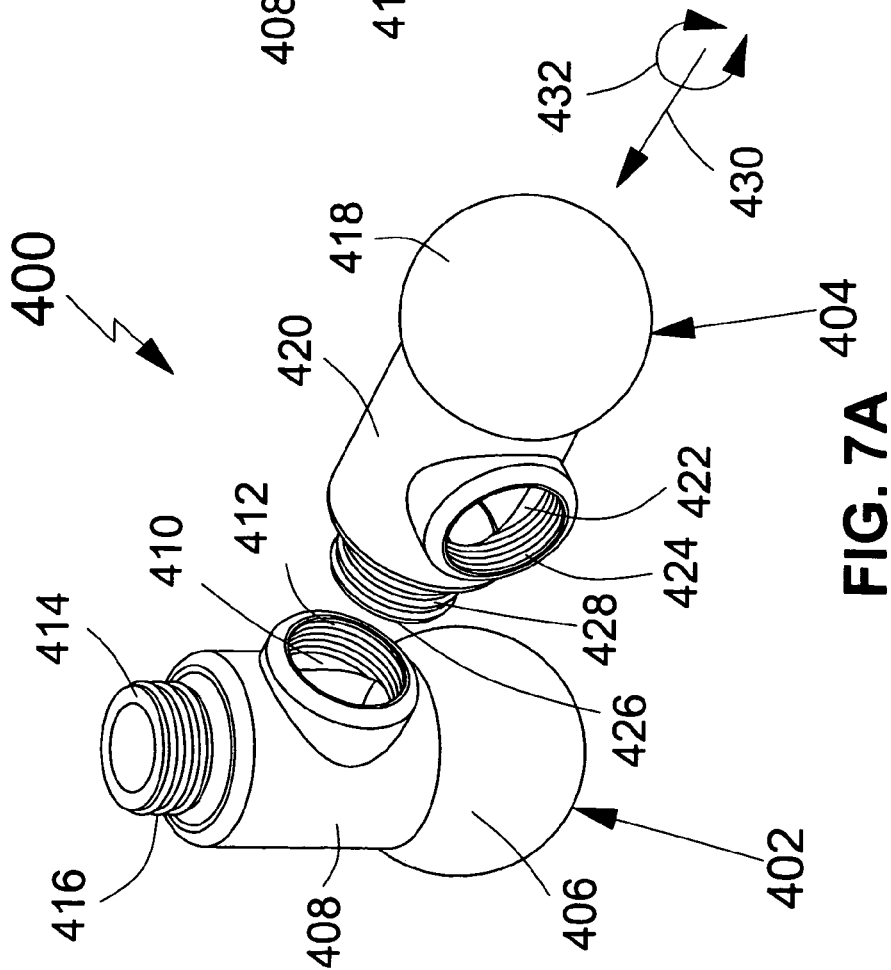
FIG. 7B
FIG. 7A

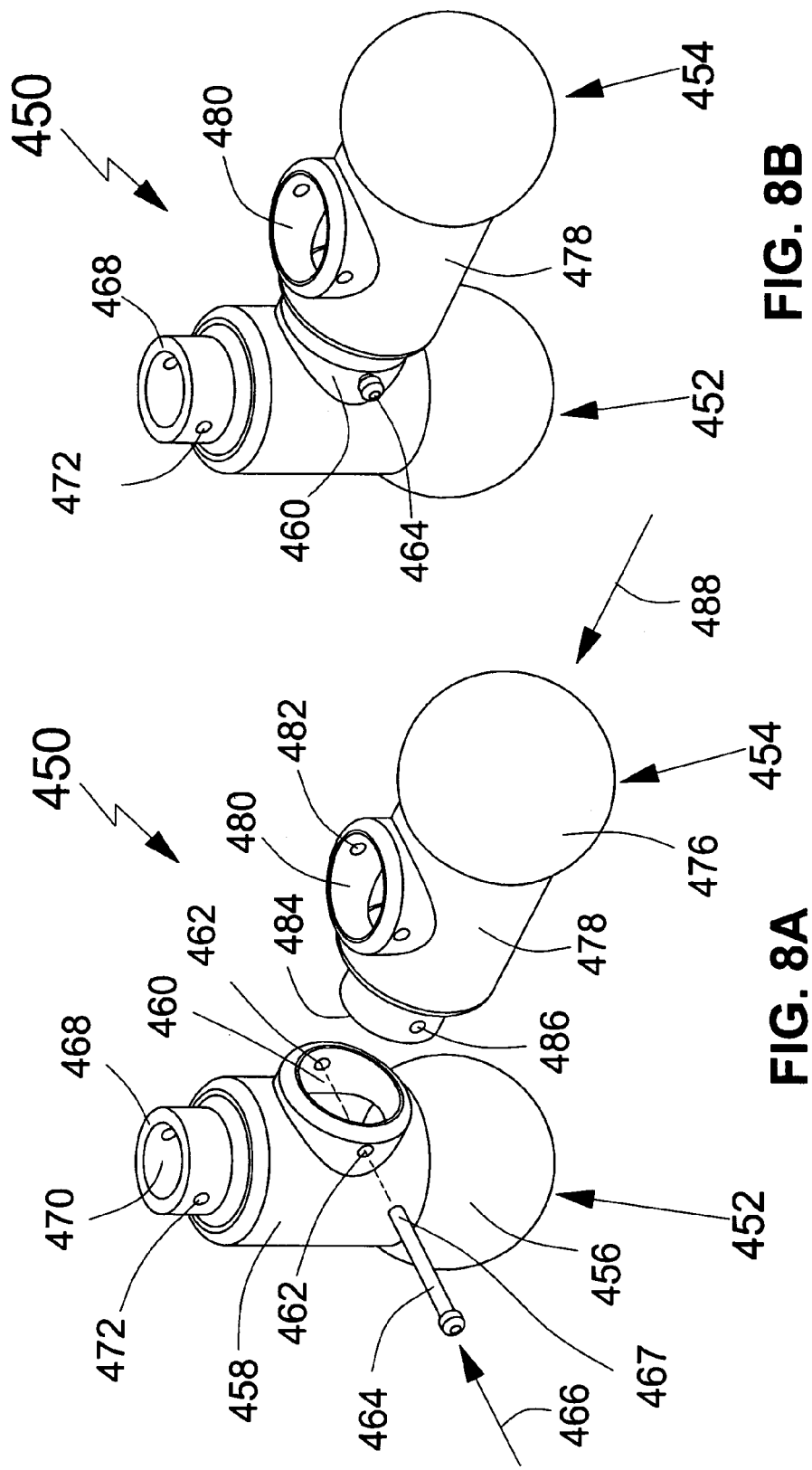

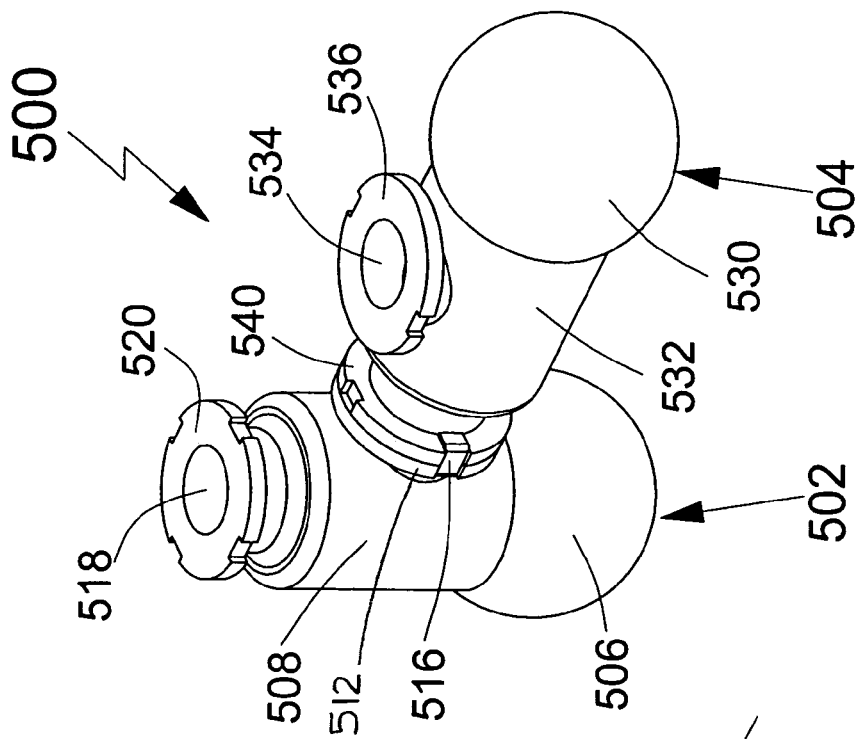
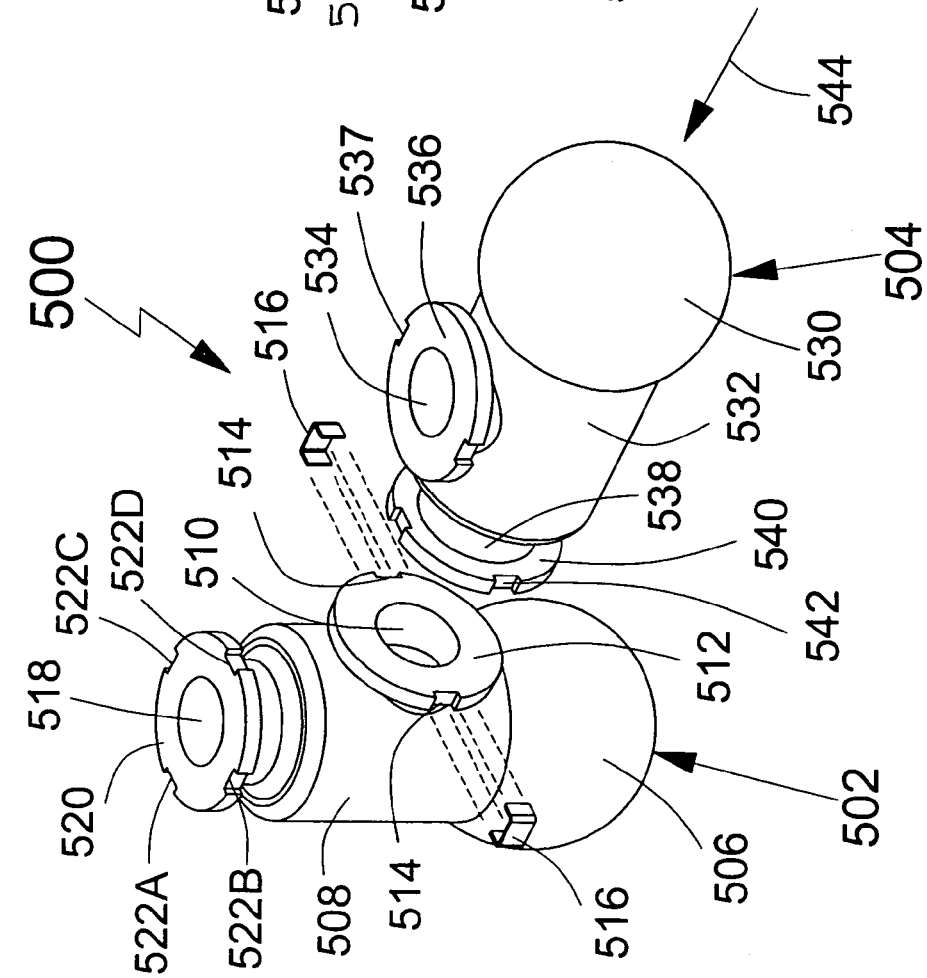

FOOD DISPENSING INTERLOCKING ANIMAL TOY SYSTEM

RELATED APPLICATION

The present application claims the benefit of priority to U.S. Provisional Patent Application Ser. No. 60/457,835 filed Mar. 25, 2003, and currently co-pending.

FIELD OF THE INVENTION

This invention relates to animal toys used to entertain and educate animals. More specifically, though not exclusively, the present invention relates to animal toys having the capability to connect to other similar toys thereby increasing the level of entertainment and education for animals.

BACKGROUND OF THE INVENTION

Currently available animal toys are not challenging enough for animals. For instance, most solid toys capture the interest of animals for a short period of time, however, after a while, the animal becomes bored and loses interest in the toy. These solid animal toys are far too simple and do not provide enough mental stimulation for the animal.

For example, U.S. Pat. No. 6,623,328, which issued to Theel for an invention entitled "Dismemberable Canine Appeasement Device and Method" discloses an animal toy that comprises a number of distinct segments that may be separated. In use, the animal can play with the Theel toy until the segments are separated. However, with just a little experience with the toy, the animal will soon learn the trick for separating the segments and lose interest in the toy.

Similarly, animal toys with internal chambers for holding food only challenge the animal until the animal determines the trick for removing the food. After they learn that trick, the animal quickly extracts the food and loses interest in the toy. These simple food dispensing animal toys do not hold the animal's attention for long enough to be of any real training, or entertainment value.

For example, U.S. Pat. No. 5,865,146 which issued to Markham for an invention entitled "Bouncing Pet Toy" discloses a toy having an elongated hollow body. Edible food treats can be inserted into the hollow body for removal by the animal. However, the hollow body presents only a brief challenge to the animal, and once the trick for removing the food from the hollow body is determined, the animal quickly removes the food and loses interest in the toy.

In light of the above, what is needed is a way to make animal toys more interesting and complex, and allow human caretakers to build up and regulate the complexity of the toys therefore making the toy more challenging for the animals to play with.

BRIEF SUMMARY OF THE INVENTION

The present invention includes an animal toy system, which features the ability to connect two or more separate toys, of varying shape, size, color, and/or texture, together to create larger and more complex toy systems. The present invention provides for an almost endless variety of toy systems to capture the interest as well as challenge and develop the animal's problem solving skills and abilities. The animal toys may be either solid or include internal chambers for holding and ultimately dispensing food. When two or more toys with the internal chambers are combined the food may flow from the chamber of one toy into another toy several times before exiting the toy system.

The ability to present an animal with a toy system having an increased level of difficulty for extracting the food challenges the animal and develops the animal's problem-solving skills and abilities. Combining solid and food dispensing toys in random combinations further increases the problem-solving skills required by the animal to completely extract the food from the toy system. As the animal develops its skills to the point where an additional challenge is needed, the configuration of toys may be changed, or a restriction may be added to the toy to slow down the flow of food from the internal chambers out of the toy system. The restriction increases the challenge to completely extract the food from the toy system.

The present invention includes several advantages over currently available toys, including, but not limited to, the following:

a. It provides a more interesting and complex toy for animals to play with;

b. It increases the usefulness of a toy by eliminating the animal's loss of interest with simple toys;

c. It allows the animal's caretaker to regulate the toy's level of difficulty commensurate with the animal's skills and entertainment needs;

d. Allows toys to be connected to create an almost endless variety of toy systems for the animals;

e. It provides an improved method of retaining and dispensing food to reward the animal for playing with the toy and learning how to solve the problem of removing the food;

f. It gives the animal's caretaker a method of incrementally increasing the level of difficulty for purposes of training and developing problem solving skills; and g. It provides the challenge of disassembling the toy system in a non-destructive manner.

BRIEF DESCRIPTION OF THE DRAWING

The aforementioned and other advantages of the animal toy system of the present invention will become more apparent to those skilled in the art upon making a thorough review and study of the following detailed description of the invention when reviewed in conjunction with the drawings in which like references numerals refer to like parts, and wherein:

FIG. 1B is a cross-sectional view of a second embodiment of the animal toy system of the present invention showing a solid body formed to receive a flared top to establish a snap fit connection where animal food may be transferred from toy-to-toy through the connection;

FIG. 1C is a cross-sectional view of a combination of the first and the second embodiments of the animal toy system of the present invention, with the first toy having a solid body, and the second toy having a hollow chamber containing treats or food, and connected to the first toy with a flared snap fit connection;

FIG. 3A is a perspective view of an alternative embodiment of the animal toy system of the present invention formed with a twist and lock connection and shown in the disconnected position;

FIG. 3B is a perspective view of the embodiment of the animal toy system of the present invention shown in FIG. 3A with the twist and lock connection in the connected position where animal food may be transferred from toy-to-toy through the connection;

FIG. 5A is a perspective view of another alternative embodiment of the animal toy system of the present invention having a magnetic connection and shown in the disconnected position;

FIG. 5B is a perspective view of the embodiment of the animal toy system of the present invention shown in FIG. 5A with the magnetic connection shown in the connected position where animal food may be transferred from toy-to-toy through the connection;

FIG. 6A is a perspective view of another alternative embodiment of the animal toy system of the present invention formed with a flange connection and shown in the disconnected position;

FIG. 6B is a perspective view of the embodiment of the animal toy system of the present invention shown in FIG. 6A with the flange connection shown in the connected position where animal food may be transferred from toy-to-toy through the connection;

FIG. 7A is a perspective view of another alternative embodiment of the animal toy system of the present invention formed with a ribbed friction fit connection and shown in the disconnected position;

FIG. 7B is a perspective view of the embodiment of the animal toy system of the present invention shown in FIG. 7A with the ribbed friction fit connection shown in the connected position where animal food may be transferred from toy-to-toy through the connection;

FIG. 8A is a perspective view of another alternative embodiment of the animal toy system of the present invention formed with a bore to receive a pin to secure two toys together, and shown in the disconnected position;

FIG. 8B is a perspective view of the embodiment of the animal toy system of the present invention shown in FIG. 8A, with the pin installed in the bore and the two toys in the connected position where animal food may be transferred from toy-to-toy through the connection;

FIG. 9A is a perspective view of another alternative embodiment of the animal toy system of the present invention formed with a flange and having a clip connection to connect two toys together and shown in the disconnected position;

FIG. 9B is a perspective view of the embodiment of the animal toy system of the present invention shown in FIG. 9A with two toys attached together using a clip connection where animal food may be transferred from toy-to-toy through the connection;

DETAILED DESCRIPTION OF THE INVENTION

Figure 1A:
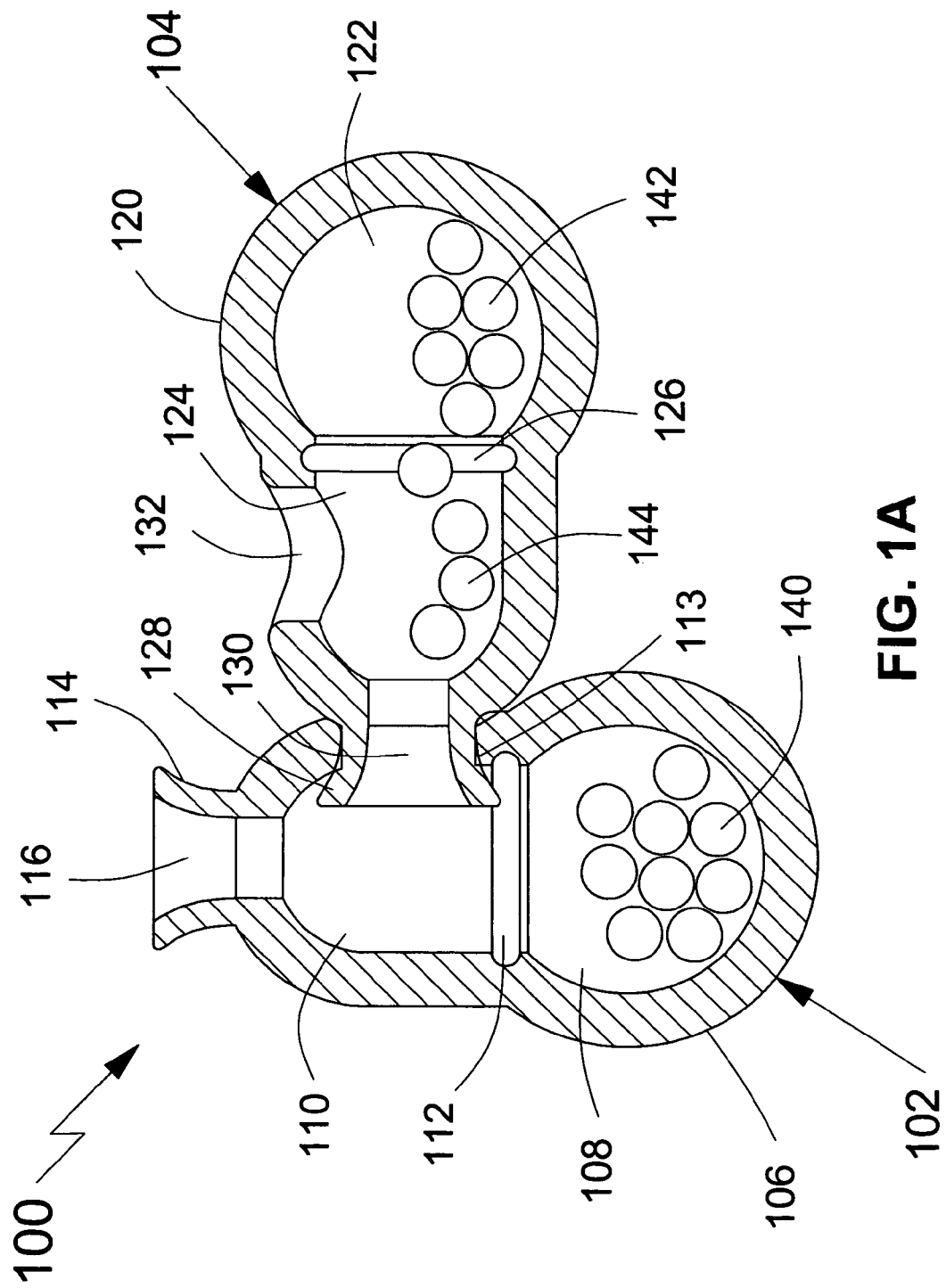
FIG. 1A is a cross-sectional view of a first embodiment of the animal toy system of the present invention showing a flared snap fit connection, and with each toy formed with a hollow chamber containing animal treats or food.

Referring initially to FIG. 1A, a first embodiment of the animal toy system of the present invention, generally designated 100 includes a first toy 102 and a second toy 104. The first toy 102 is has a body 106 formed with a first chamber 108, a second chamber 110, a restriction receiving groove 112 disposed between the first chamber 108 and the second chamber 110, a side hole 113, a top hole 116 formed with a flared rim 114. It is to be appreciated that the location of the holes 113 and 116 shown in the preferred embodiments are merely exemplary, and that these holes may be positioned differently on the toy body 106 without departing from the present invention.

The toy of the present invention may be manufactured by one of several methods including, but not limited to, injection molding, blow molding, compression molding, and rotational molding. Other forming techniques may be used, as are known in the art.

The toy 102 may be made from a soft and easily deformable material, such as natural or synthetic rubber, a semi rigid plastic, or a rigid plastic. It is to be appreciated that although particular materials are disclosed herein in conjunction with the various preferred embodiments, that these materials are not limiting. Rather, the toys of the present invention may be made of any material known in the art as suitable for use as an animal toy.

Additional, the toys of the present invention may be formed to include a scent appealing to an animal. For instance, in a preferred embodiment, a fragrance concentrated material may be added to the toy during the manufacturing process by melting and/or adding the fragrance material during the injection process. Alternatively, the fragrance may be sprayed onto the surfaces of the completed toy, or impregnated into the material after the manufacturing process.

A second toy 104 may be presented in combination with the first toy 102 in animal toy system 100. Second toy 104 is formed with a body 120 having a first chamber 122, a second chamber 124, a restriction receiving groove 126, and having a flared top 128 formed with a top hole 130 and a side hole 132. Second toy 104 may be connected to the first toy 102 by inserting the flared top 128 of the second toy 104 into the side hole 113 of the first toy 102. The flared top 128 of the second toy 104 will deform during the insertion into the first toy 102 in order for the flared top 128 to fit inside the smaller side hole 113 of the first toy 102. After insertion of the flared top 128 into the side hole 113 of the first toy 102, the flared top 128 returns to the original shape and the tendency to return to this original shape provides a retention force to maintain the two toys 102 and 104 together. This retention force keeps the toys connected until the toys are disconnected by pulling the second toy 104 away from the first toy 102 to remove the flared top 128 from the side hole 113.

Referring again to FIG. 1A, animal food 140 may be placed in the first chamber 108 of toy 102. As the animal plays with the first embodiment of the invention the food moves between the first chamber 108 and second chamber 110 and eventually exits the first chamber via the side hole 113 and/or the top hole 116. Similarly, animal food 142 may be placed in the first chamber 122 of the second toy 104, and the second toy 104 may be attached to the first toy 102 as discussed above. As the animal plays with the toy system of the present invention, the food 142 in the first chamber 122 of the second toy 104 moves to the second chamber 124 of the second toy 104. Once in second chamber 124 of second toy 104, the animal food 144 may pass through the side hole 132 or through the top hole 130 into the first toy 102.

As an animal gains experience with the toy system 100 of the present invention, various combinations of toys 102 and 104 may be created to provided added challenge to the animal's removal of the food from the system 100. For instance, a third toy (not shown) may be connected to the side hole 132 of the second toy 104, and a fourth toy (not shown) may be connected to the side hole of the third toy. The addition and reconfiguration of toys to the toy system of the present invention can result in an endless number of toy combinations and shapes.

While the present invention as disclosed in conjunction with FIG. 1A has a first chamber 108, and a second chamber 110, it is to be appreciated that such a limitation is not intended. Rather, a toy consistent with the animal toy system of the present invention may be formed with any number of chambers. These multiple chambers may be connected to form a serial path for food dispensing, or the chambers may be unconnected forming more than one food dispensing location in a single toy. As discussed in conjunction with FIG. 1B, a single chambered toy may be partitioned with a restriction device to form multiple chambers within a single toy.

Additionally, though FIGS. 1A and 1B depict a substantially hollow toy and a substantially solid toy, respectively, it is to be appreciated that alternatives and combinations of these toys are fully contemplated herein. For instance, the toys of the present invention may be formed with a single chamber smaller than the toy body, representing a toy being partially solid and partially hollow. No limitations as to the size or shape of the chamber is intended by the descriptions of the preferred embodiments herein.

Referring to FIG. 1B, a second embodiment of the animal toy system of the present invention is shown and hereafter referred to as the solid toy, or solid-body toy. The solid body toy is generally designated 150 and includes a solid body 152 formed with a flared top 154 having a top hole 156, and a side hole 158. A second toy 160 may be similar to toy 150, and includes a solid body 162, a flared top 164 having a top hole 166, and a side hole 168. Side holes 158 and 168 are sized to receive flared top 154 and 164 to retain the animal toys 150 and 160 together.

This embodiment of the animal toy system of the present invention may be made from the same process and materials as the first embodiment of the invention. The solid toy may be connected with other solid toys in the same manner as the first embodiment of the invention. The first chamber may be used for receiving only the flared top of a second toy. The second embodiment does not require a second chamber for the purposes of receiving and dispensing food to the animal. A small amount of food may be placed in the area within the flared top 164 to be released when the toys are separated.

It is to be appreciated that toys from the first animal toy system 100 of the present invention may be combined with solid toys 150 and 160 from the second embodiment of the invention as previously described to make more complex and varying combinations and shapes for the animals. For instance, referring to FIG. 1C, the first and second embodiments are combined to form a toy system with a variation using both embodiments of the present invention. More specifically, toy 150 having a solid body 152 may be combined with a toy 104 having a first chamber 122 and a second chamber 124 containing food 142 and 144 by inserting flared top 128 into side hole 158. In this configuration, food 144 may exit side hole 132 as the animal manipulates the toy system. Once toy 104 is separated from toy 152, food may also exit top hole 130.

Figure 2A:
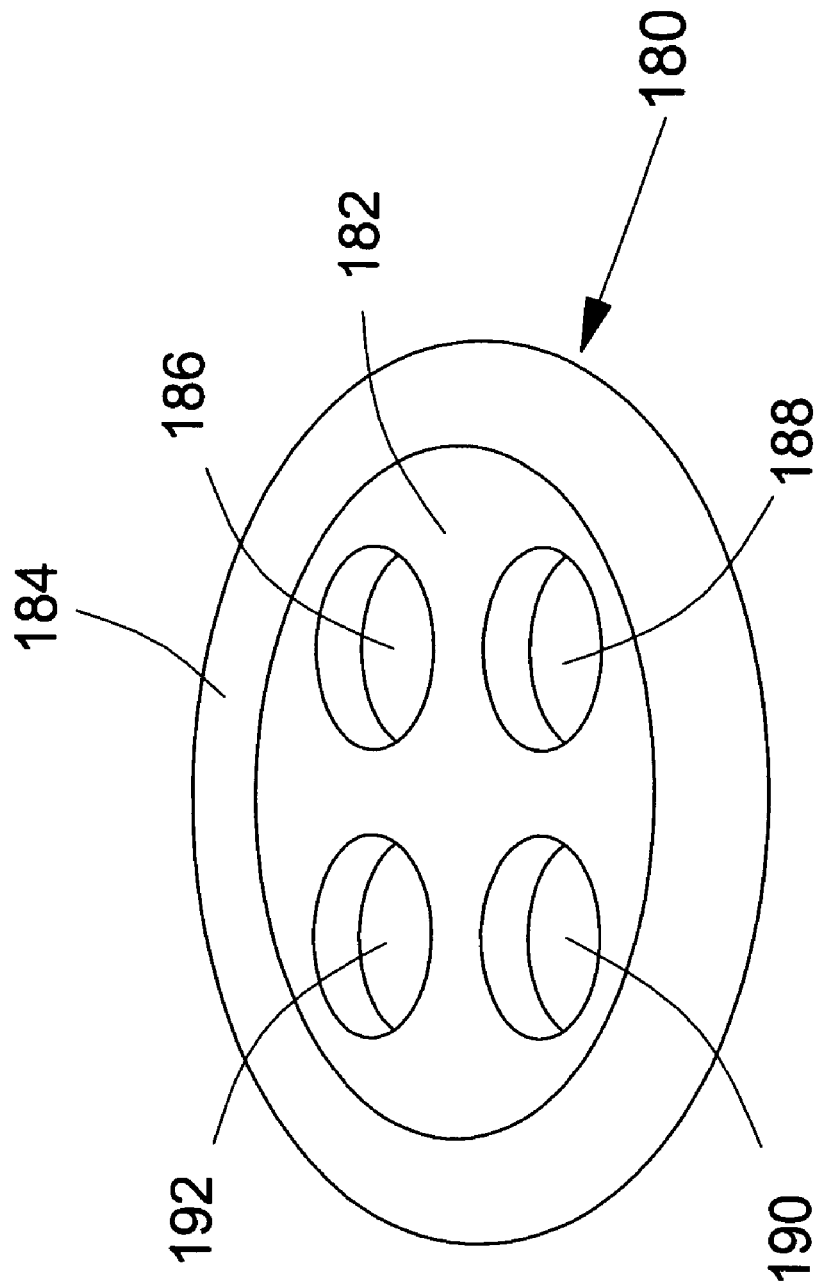
FIG. 2A is a perspective view of the internal restriction of the animal toy system of the present invention shown in FIG. 2B, and is formed with restriction openings for reducing the flow of food from the internal chamber.

Referring to FIG. 2A, a restriction device 180 is shown, which comprises an interface ring 184 sized to be received within the restriction receiving groove 112 and 126 within toys 102 and 104, respectively, to establish a barrier 182 between the first chamber 108 and the second chamber 110. The restriction device 180, also referred to as a baffle, may be formed with at least one opening 186, 188, 190, 192 for allowing food 140 to pass through the restriction device 180. The diameters of the openings 186, 188, 190 and 192 may vary depending on the food types contained within the toys of the present invention, and to provide for different flow rates of food through the restriction device. In a preferred embodiment, restriction device 180 may be solid, serving to provide two distinct chambers within the toy. The restriction device 180 may be made from the same process and materials as the embodiment of the other embodiments of the animal toy system of the present invention.

Figure 2B:
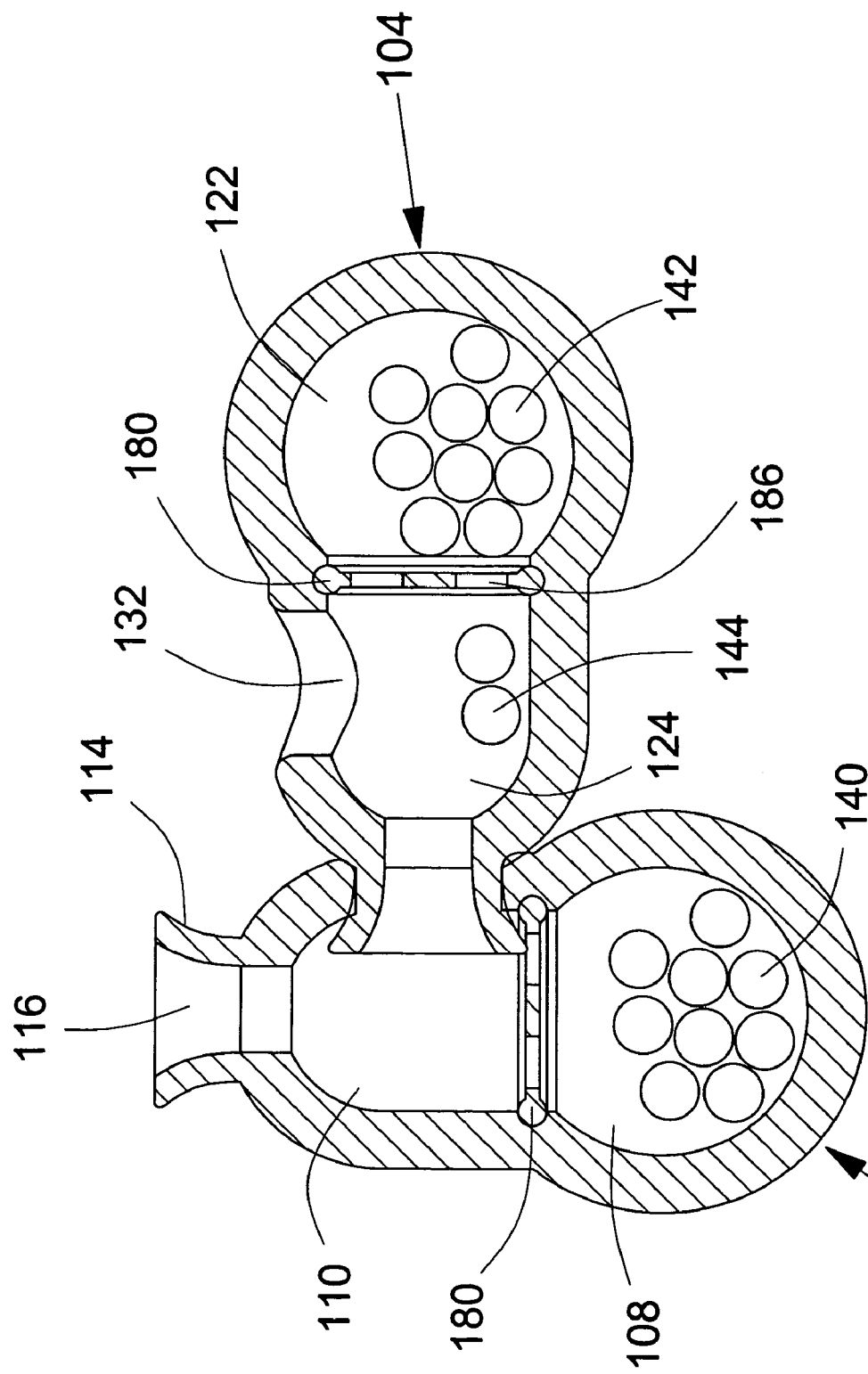
FIG. 2B is an cross-sectional view of the first embodiment of the animal toy system of the present invention, and equipped with an internal restriction for reducing the flow of food from the chamber.

Referring now to FIG. 2B, the animal toy system 100 of the present invention is shown equipped with the restriction device 180 of FIG. 2A. More specifically, toy 102 further comprise a restriction device 180 disposed between the first chamber 108 and the second chamber 110 within the restriction receiving groove 112. The restriction device 180 reduces the rate of flow of food 140 from the first chamber 108 to the second chamber 110 and out of the side hole 113 and top hole 116 of the toy or toy combinations. The restriction device 180 may be made from the same process and materials as the first embodiment of the invention. The restriction device 180 may be inserted into the toys of the animal toy system of the present invention for the purposes of reducing the flow of food 140 from the first chamber 108 into the second chamber 110 and out of the top hole 116 or the side hole 113 of the present invention.

Referring to FIGS. 3A and 3B, an alternative embodiment of the animal toy system of the present invention is shown, is generally designated 200, and includes an apparatus for an alternative method of connecting two or more toys, hereafter referred to as the twist and lock connection. More specifically, toy system 200 includes a first toy 202 and a second toy 204. First toy 202 includes a first chamber 206, a second chamber 208 formed with a side hole 210 and formed with a retaining flange 212 and slots 214, and a top opening 216 formed with locking tabs 218. Similarly, second toy 204 is formed with a first chamber 220, a second chamber 222 formed with a side hole 224 and a retaining flange 226 having slots 228, and a top opening 230 having locking tabs 232.

In use, the twist and lock connection comprises at least one locking tab, 232 at least one tab slot 214 in the opening of the side hole 210, and a retaining flange 212 formed in the side hole 210. The tab(s) 232 on the top 230 of the second toy 204 is aligned with and inserted into the tab slot(s) 214 in the side hole 210 of the first toy 202. After insertion, the second toy 204 is rotated in direction 234 approximately ninety degrees (90°) which moves the tab(s) 232 of the second toy 204 behind the retaining flange 212 of the side hole 210 of the first toy 202. Toys 202 and 204 are shown in the connected configuration in FIG. 3B. Toys 202 and 204 may be disconnected by the rotating the second toy 204 until the tab(s) 232 of the top 230 of the second toy 204 are aligned with the slot(s) 214 of the side hole 210 of the first toy 202 allowing the toys 202 and 204 to be pulled apart. Alternatively, with reference to all embodiments of the present invention disclosed herein, due to the pliable nature of the material comprising the toys of the present invention, it may be possible to separate the toys of the present invention simply by pulling them apart with sufficient force without damaging the various connections formed in the toys.

Figure 4B:
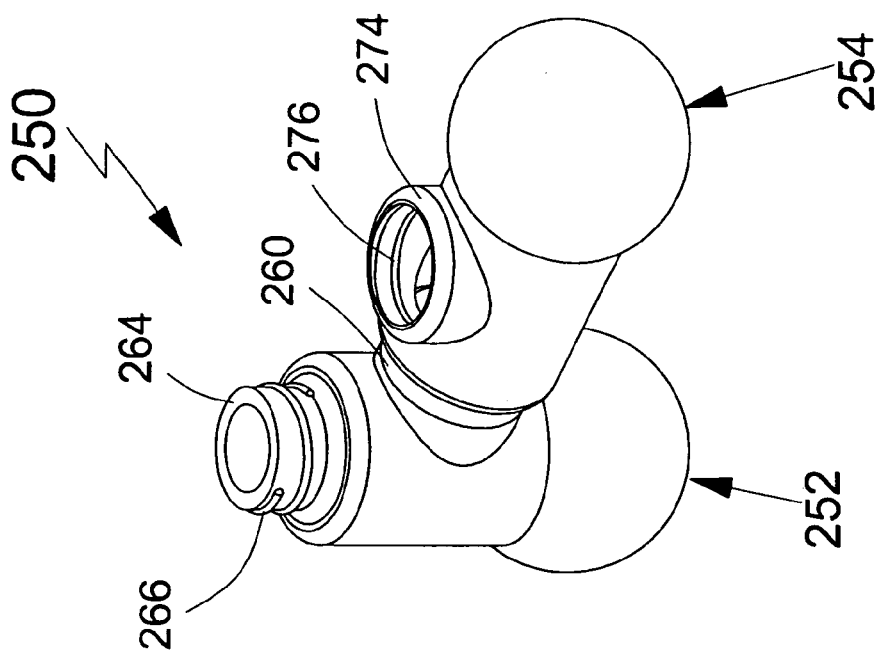
FIG. 4B is a perspective view of the embodiment of the animal toy system of the present invention shown in FIG. 4A with the threaded connection in the connected position where animal food may be transferred from toy-to-toy through the connection.
Figure 4A:
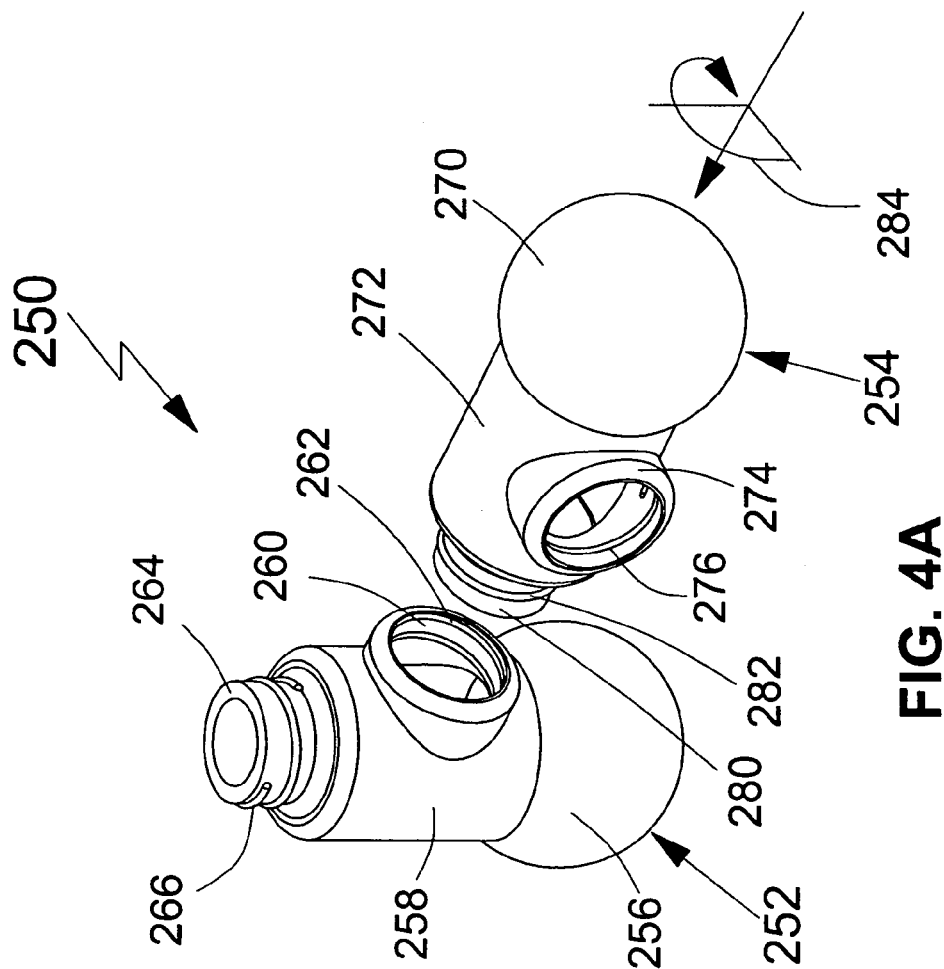
FIG. 4A is a perspective view of another alternative embodiment of the animal toy system of the present invention formed with a threaded connection and shown in the disconnected position.

Referring to FIGS. 4A and 4B, an alternative embodiment of the animal toy system of the present invention is shown and generally designated 250. Toy system 250 includes a first toy 252 and a second toy 254. First toy 252 includes a first chamber 256, a second chamber 258 formed with a side hole 260 having a female helical thread 262, and having a top 264 having a male helical thread 266. Similarly, second toy 254 includes a first chamber 270, a second chamber 272 formed with a side hole 274 having a female helical thread 276, and having a top 280 having a male helical thread 282. This embodiment of the present invention is hereafter referred to as the threaded connection.

The threaded connection comprises a male helical thread 282 around the top 280 and a female helical thread 262 inside the side hole 260 for receiving the male helical thread 266. In use, the male helical thread 282 on the top 280 of the second toy 254 is inserted into the side hole 260 of the first toy 252 and rotated in direction 284 until the male helical thread 282 engages with the female helical thread 262 inside the side hole 260 of the first toy 252. The toys may be disconnected by the rotating the second toy 254 in a direction opposite direction 284 until the male helical thread 282 on the top 280 of the second toy 254 completely disengages from the female helical thread 262 in the side hole 260 of the first toy 252 allowing the toys to be pulled apart.

Referring now to FIGS. 5A and 5B, an alternative embodiment of the animal toy system of the present invention is shown, is generally designated 300, and includes an alternative method of connection, hereafter referred to as the magnetic connection. Animal toy system 300 includes a first toy 302 and a second toy 304. First toy 302 includes a first chamber 306, a second chamber 308 formed with a side hole 310 having a magnetic element, such as an annular magnet 312, and a top 314 formed with another magnetic element, such as an annular magnet 316. Similarly, second toy 304 includes a first chamber 320, a second chamber 322 formed with a side hole 324 having an annular magnet 326, and a top 328 formed with an annular magnet 330.

The magnetic connection of the present embodiment comprises a magnet 330 around the top 328 of the second toy 304, and another magnet 312 around the side hole 310 of the first toy 302. In use, toys 302 and 304 are connected together by inserting the top 328 of the second toy 304 into the side hole 310 of the first toy 302 in direction 332 such that the annular magnet 330 around the top 328 of the second toy 304 is magnetically attracted to the annular magnet 312 around the side hole 310 of the first toy 302. Once attached, second toy 304 may rotate in direction 334 without disconnecting from first toy 302.

The magnet material may be attached to the toys 302 and 304 by insert molding, adhesive, thermal forming or any equivalent methods known to someone skilled in the art of attaching parts together. Also, it is to be appreciated that annular magnets 312 and 330 are of opposite polarity in order to provide for optimum magnetic attraction between the two toys 302 and 304. While magnets 312, 330, 316 and 326 are shown to have a ring-shape, it is to be appreciated that other magnetic element shapes may be used, including the embedding of the magnetic elements within the body of the toys as shown by dashed lines 340. Also, it is to be appreciated that the magnetic elements discussed herein may include non-magnets, such as iron or other ferrous materials having an attraction to magnets. In such circumstances, only one magnet needs to be incorporated into the present invention, as the corresponding magnetic element may be a non-magnet material.

Toys 302 and 304 may be disconnected by pulling the second toy 304 from the first toy 302 with a force large enough to overcome the magnetic attraction between the magnets 330 and 312 around the top 328 of the second toy 304 and the magnet 312 around the side hole 310 of the first toy 302.

Referring to FIGS. 6A and 6B, an alternative embodiment of the animal toy system of the present invention is shown, is generally designated 350, and includes an alternative method of connection, hereafter referred to as the flange connection. More specifically, animal toy system 350 includes a first toy 352 and a second toy 354. First toy 352 includes a first chamber 356, a second chamber 358 having a side hole 360 formed with a flange 362 with mounting holes 364 and having an attachment material 366, and a top 368 having a flange 370 having an attachment material 372. Similarly, second toy 354 includes a first chamber 376, a second chamber 378 having a side hole 380 formed with a flange 382 with mounting holes 384 and having an attachment material 385, and a top 386 having a flange 388 having an attachment material 390.

As shown in FIG. 6B, the toys of the animal toy system of the present invention may be connected together by placing the top flange 388 of the second toy 354 in contact with the side flange 362 of the first toy 352. The flanges can be held together by a bolt 392 as shown or alternatively, a variety of attachment materials, or fasteners, 372, 385 may be used, such as Velcro, a zip tie, lacing or string, double sided tape, or adhesive.

The toys 352, 354 may be disconnected by removing the bolt 392, or zip tie, lacing or string. Alternatively, if the two toys 352, 354 are attached by fasteners such as Velcro, double sided tape, or adhesive, the toys must be pulled apart with force great enough to break the bond of the fastening Velcro, tape, or adhesive.

Referring to FIGS. 7A and 7B, another alternative embodiment of the animal toy system of the present invention is shown, is generally designated 400, and includes an alternative method of connection, hereafter referred to as the rib connection. More specifically, animal toy system 400 includes a first toy 402 and a second toy 404. First toy 402 includes a first chamber 406, a second chamber 408 having a side hole 410 formed with one or more annular grooves 412, and a top 414 formed with one or more annular ribs 416. Similarly, second toy 404 includes a first chamber 418, a second chamber 420 having a side hole 422 formed with one or more annular grooves 424, and a top 426 formed with one or more annular ribs 428.

In use, the rib connection includes at least one annular rib 428 around the top 426 of the second toy 404, and at least one annular groove 412 inside the side hole 410 of the first toy 402 for receiving the annular rib 428 from the top 426 of the second toy. The toys 402, 404 are connected together by inserting the top 426 of the second toy 404 into the side hole 410 of the first toy 402 in direction 430. The rib(s) 428 on the top 426 of the second toy 404 and the groove(s) 412 in the side hole 410 of the first toy 402 deform during the insertion until the annular groove(s) 412 inside the side hole 410 of the first toy 402 has received the annular rib(s) 428 from the top 426 of the second toy 404 resulting in a friction fit between the first toy 402 and second toy 404.

In this configuration, second toy 404 may be rotated in direction 432 without disconnecting the two toys 402 and 404. The toys 402 and 404 may be disconnected by pulling the toys apart with enough force to deform the annular groove(s) 412 inside the side hole 410 of the first toy 402 and the annular ring(s) 428 around the top 426 of the second toy 404 enough to disengage the friction fit.

As an alternative embodiment of the animal toy system of the present invention shown in FIGS. 7A and 7B, it is contemplated herein that the hole 410 and the top 426 may be smooth (without ribs 428 or grooves 412) and having similar diameters such that top 426 may be inserted into hole 410 and retained in place by frictional forces acting between the interior surface of hole 410 and the external surface of top 426.

Referring now to FIGS. 8A and 8B, another alternative embodiment of the animal toy system of the present invention is shown, is generally designated 450, and includes an alternative method of connection, hereafter referred to as the pin connection. More specifically, animal toy system 450 includes a first toy 452 and a second toy 454. First toy 452 includes a first chamber 456, a second chamber 458 having a side hole 460 formed with a pair of diametrically opposed bores 462 sized to receive a pin 464 inserted into the bores 462 in direction 466. First toy 452 also includes top 468 formed with a pair of bores 472 located diametrically across hole 470. Similarly, second toy 454 includes a first chamber 476, a second chamber 478 having a side hole 480 formed with a pair of diametrically opposed bores 482 sized to receive a pin inserted into the bores. Second toy 454 also includes top 484 formed with a pair of bores 486 located diametrically across hole 484.

In use, the pin connection comprises a pin 464 for connecting the first toy 452 and the second toy 454 together, in combination with bores 486 in the top 484 of the second toy 454 and bores 462 formed in the side hole 460 of the first toy 452 sized to receive the pin 464. The toys 452 and 454 are connected together by inserting the top 484 of the second toy 454 into the side hole 460 of the first toy 452. The second toy 454 is inserted into the first toy 452 in direction 488 to align the bores 486 in the top 484 of the second toy 454 with the bores 462 formed in the side hole 460 of the first toy 452 in order to receive pin 464. The pin 464 is then inserted in direction 466 through the bores 462 of the first toy 452 and the bores 486 formed in the second toy 454, which securely connects the first and second toys 452 and 454 together. Once pin 464 is fully inserted, a nut (not shown) or other fastener known in the art, may be installed onto the distal end 467 of pin 464 in order to secure pin 464 in place though toys 452 and 454. In this configuration, toys 452 and 454 may be disconnected by removing the pin 464 from the toys 452 and 454 and then removing the second toy 454 from the first toy 452.

In a preferred embodiment, the pin 464 may be made from an edible material, such as rawhide, or other animal food product. An edible pin 464 allows the animal using the animal toy system 450 of the present invention an opportunity to separate the toys 452 and 454 to gain access to the food within the chambers Referring to FIGS. 9A and 9B, another alternative embodiment of the animal toy system of the present invention is shown, is generally designated 500, and includes an alternative method of connection, hereafter referred to as the clip connection. More specifically, animal toy system 500 includes a first toy 502 and a second toy 504. First toy 502 includes a first chamber 506, a second chamber 508 having a side hole 510 formed with a flange 512 formed with two or more notches 514 sized to receive clips 516, and a top 518 formed with a flange 520 formed with notches 522A, 522B, 522C, and 522D. Similarly, second toy 504 includes a first chamber 530, a second chamber 532 having a side hole 534 formed with a flange 536 formed with two or more notches 537 sized to receive clips 516, and a top 538 formed with a flange 540 formed with notches 542.

In use, the clip connection includes a flange 540 having notches 542 and formed around the top 538 of the second toy 504, and a corresponding flange 512 having notches 514 and formed around the side hole 510 of the first toy 502. The toys 502 and 504 are connected together by placing the top flange 540 of the second toy 504 in contact with the flange 512 of the first toy 502 such that notches 542 are aligned with notches 514. Once in position, the flanges 540 and 512 are held together by attaching clips 516 as shown by dashed lines in FIG. 9A. These clips 516 maintain the toys 502 and 504 together and are not intended to disconnect through normal use of the animal toy system 500 by an animal. However, the toys 502 and 504 may be disconnected by removing the clips 516 from the toys and separating the toys.

Figures 10A, 10B:
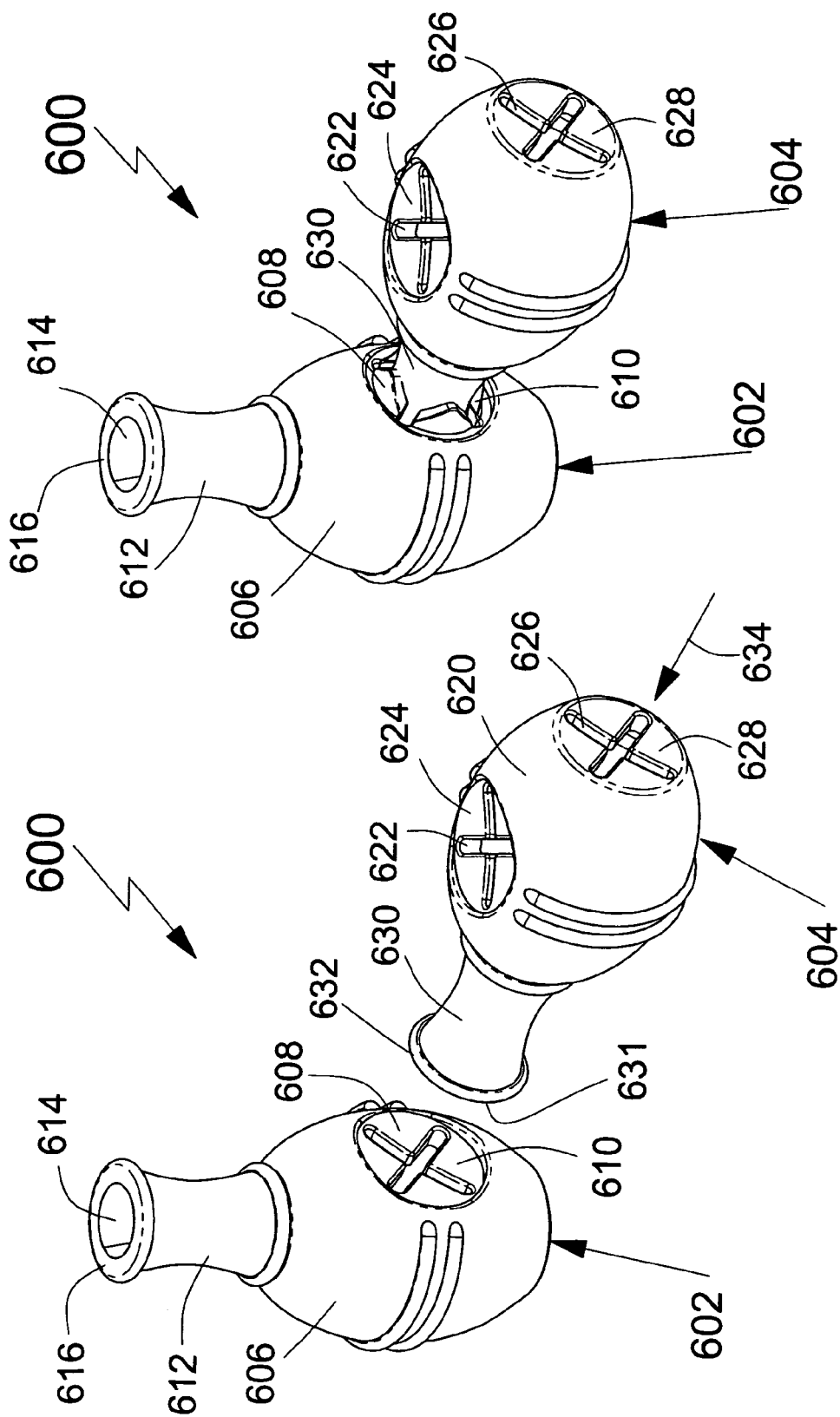
FIG. 10A is a perspective view of another alternative embodiment of the animal toy system of the present invention formed with an X-shaped opening to receive a flared top and shown in the disconnected position.
FIG. 10B is a perspective view of the embodiment of the animal toy system of the present invention shown in FIG. 10A with the two toys shown in the connection position where animal food may be transferred from toy-to-toy through the connection.

Referring now to FIGS. 10A and 10B, another alternative embodiment of the animal toy system of the present invention is shown, is generally designated 600, and includes an alternative method of connection, hereafter referred to as the nozzle connection. More specifically, animal toy system 600 includes a first toy 602 and a second toy 604. First toy 602 includes a chamber 606 formed with a slotted opening 608 having retention flaps 610, and a nozzle 612 leading to an opening 614 surrounded by a rim 616. Similarly, second toy 604 includes a chamber 620 formed with a slotted opening 622 having retention flaps 624, and a nozzle 630 leading to an opening 631 surrounded by a rim 632. As shown, toys 602 and 604 of animal toy system 600 may be formed with a slotted opening 626 having retention flaps 628 on the bottom of the toy.

In use, the nozzle connection includes a rim 632 formed around the opening of the nozzle 630 of the second toy 604, and a slotted opening 608 having retention flaps 610 formed in the second toy 604. The toys 602 and 604 are connected together by placing the rim 632 of the second toy 604 in contact with the retention flaps 610 of the first toy 602. Once in position, the second toy is urged in direction 634 such that retention flaps 610 are displaced inwards in the chamber 606 of the first toy 602. As the second toy is advanced in direction 634, the nozzle 630 of the second toy 604 deforms the retention flaps 610 into the chamber 606 and passes through slotted opening 608 where the retention flaps 610 retain the nozzle 632 within chamber 606.

The toy system 600 of the present invention may be used in an alternative configuration wherein the retention flaps 610 are extending externally to chamber 606. More specifically, once nozzle 630 is inserted into the chamber 630 by pushing the retention flaps 610 inwards, the nozzle 630 may be withdrawn slightly resulting in the retention flaps 610 extending outwards from the chamber while retaining the nozzle 630 within the chamber.

In the connected configuration, food contained within the two toys 602 and 604 may pass between the toys and out nozzle 612 as the animal plays with the toy. Toys 602 and 604 may be disconnected by pulling toy 604 in the direction opposite 634 to remove the rim 632 of nozzle 630 from slotted opening 608 thereby separating the toys.

Figure 11:
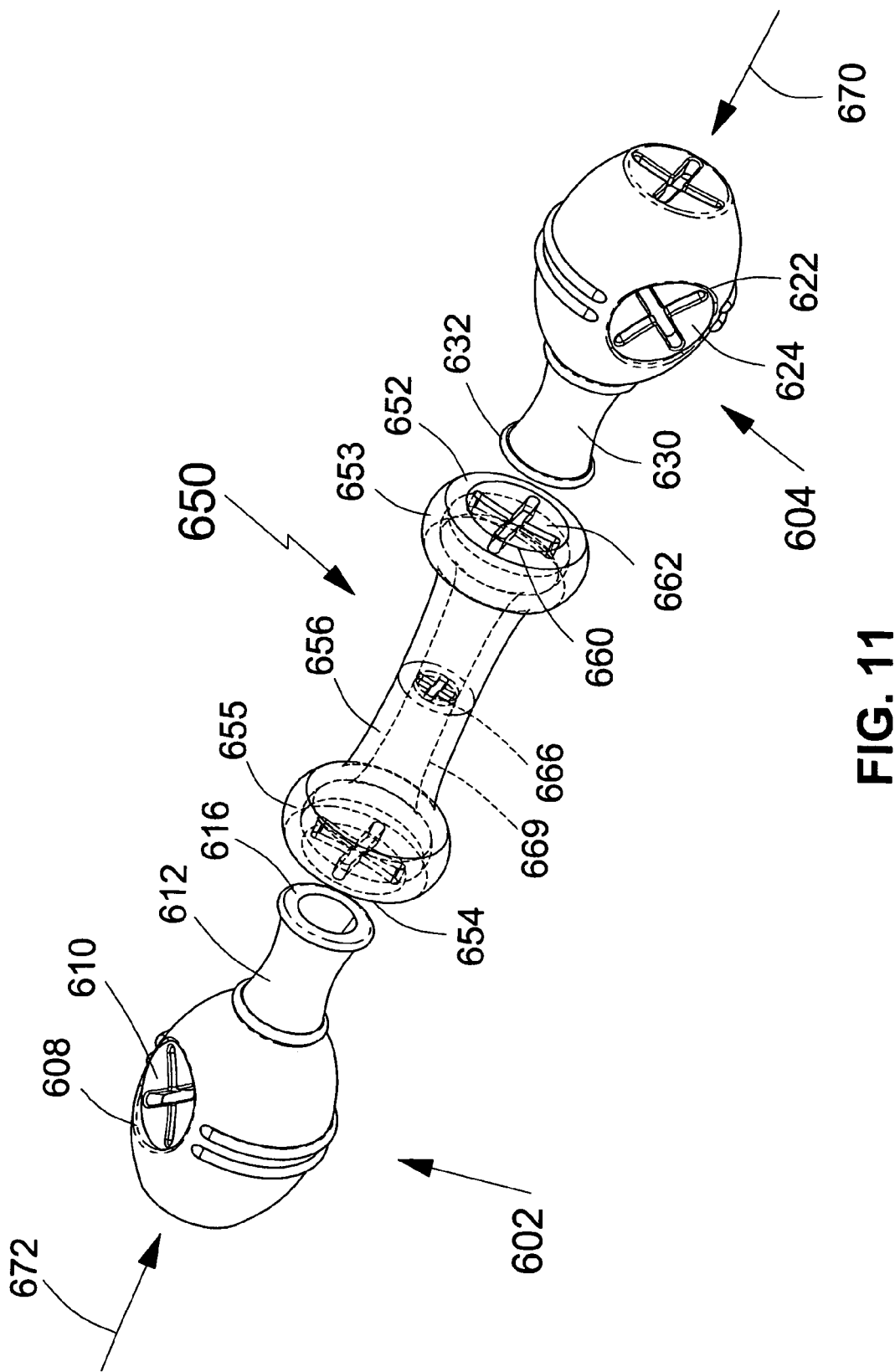
FIG. 11 is a perspective view of another alternative embodiment of the animal toy system of the present invention using the system shown in FIGS. 10A and 10B, and incorporating a tubular union extending between two toys to allow the flow of food through the union and between the toys.

Referring now to FIG. 11, an alternative embodiment of animal toy system 600 is shown having an intermediate union generally designated 650. Union 650 includes a first end 652 having a chamber 653, and a second end 654 having a chamber 655, joined together with a tubular segment 656. Chamber 653 is formed with a slotted opening 660 having retention flaps 662, and chamber 655 may be formed with a similar opening 668 (shown in dashed lines). Tubular segment 656 may be hollow (as shown in dashed lines 669) to allow food to pass freely through the tubular segment 656 between chamber 653 and chamber 655, or it may be formed with a baffle 666 (shown in dashed lines), or a restriction as shown in FIG. 2A, to slow or prevent the passage of food through the tubular segment.

In use, a first toy 602 is positioned with its nozzle 612 adjacent the second end 654 of the union 650, and a second toy 604 is positioned with its nozzle 630 adjacent the first end 652 of the union 650. Once positioned, the first and second toys 602 and 604 are advanced toward union 650 in direction 670 and 672, respectively, such that the rims 616 and 632 of nozzles 612 and 630 are pushed through slotted openings 668 and 660 and into chambers 655 and 653, respectively. Once advanced into the chambers 655 and 653, the retention flaps 662 retain the toys 602 and 604 in place. The toys 602 and 604 may be removed from union 650 by pulling the nozzles 612 and 630 from slotted openings 668 and 660.

Figure 12:
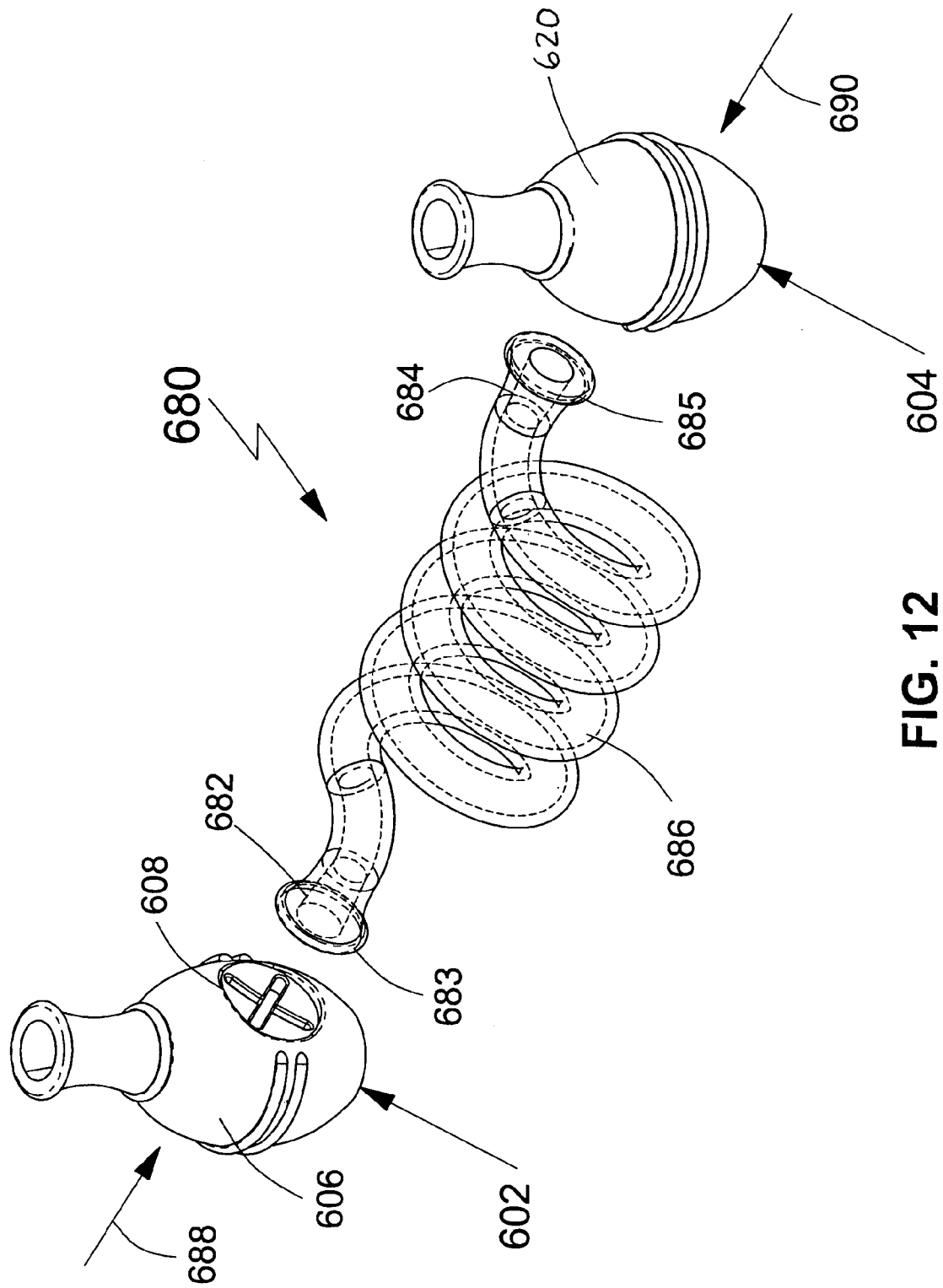
FIG. 12 is a perspective view of another alternative embodiment of the animal toy system of the present invention using the system shown in FIGS. 10A and 10B, and incorporating a coil extending between two toys to elastically join the two toys together, and may provide for the passage of food between the two toys through a lumen (or passageway) formed through the coil (shown in dashed lines).

Referring to FIG. 12, an alternative embodiment of the animal toy system 600 of the present invention is shown and includes a coil 680 extending between a first toy 602 and a second toy 604 to elastically join the two toys 602 and 604 together. Coil 680 is formed with a first end 682 having a rim 683, and a second end 684 having a rim 685, with a coiled section 686 extending between the two rims 683 and 685. In use, toys 602 and 604 are positioned near rims 683 and 685, and advanced in directions 688 and 690 such that rims 683 and 685 pass through slotted openings 608 of first toy 602 and 622 of second toy 604 (not shown this Figure) and into the chambers 606 and 620 of the toys 602 and 604. Once inside, the retention flaps 612 of opening 610 of first toy 602 and retention flaps 624 of opening 622 of second toy 604 retain rims 683 add 685 within the toys 602 and 604, respectively.

In one embodiment, coil 680 may be solid, providing for a strong spring-like connection between toys 602 and 604. In an alternative embodiment, coil 680 may be hollow to provide for the passage of food between the two toys 602 and 604.

The present invention is in no way intended to be restricted to the description and drawings used to explain the several embodiments of the animal toy system of the present invention. The animal toy system of the present invention as described herein is not limited for use in animal toys, but should be extended to any equivalent inventions, such as for example, in the use of baby toys.

While several different embodiments of the animal toy system of the present invention are disclosed herein, it is to be appreciated that the present invention contemplates combinations of the various embodiments without departing from the spirit and scope of the present invention. Also, it is also to be appreciated that while various toys have been referred to as the "first" and "second" toy within an animal toy system of the present invention, no specific configuration, order, or preference is intended. Rather, the "first" and "second" nomenclature as used herein is merely for the purposes of facilitating the description of the animal toy systems of the present invention. The various methods of attaching one animal toy to another animal toy as presented herein are intended to illustrate preferred embodiments of the animal toy system of the present invention. Further, the toy system of the present invention as described herein may be assembled into a combination of toys to form a maze that the animal must solve in order to release the food through the various toys within the maze. This maze assembly may be changed by the person assembling the maze to provide the animal with an infinite variety of mental challenges in order to remove all of the food within the chambers.

It is also to be recognized that modifications may be made, by one of ordinary skill in the art of the invention, without departing from the intent of the animal toy system of the present invention. The scope of the present invention is to be taken as described herein as well as including all reasonable equivalents of the subject matter of the appended claims.

The invention claimed is:

1. An interlocking animal toy system, comprising:
a first toy and a second toy each having:
a body, wherein the body comprises a chamber and at least one side hole, wherein the at least one side hole comprises a slotted opening having retention flaps, and
a top hole, wherein the top hole comprises a flared rim,
wherein a diameter of the flared rim of the top hole at a first point is greater than a diameter of the top hole at a second point, wherein the second point is more proximal to the chamber than the first point, wherein the diameter of the at least one side hole is smaller then the diameter of the flared rim at the first point; and
wherein the at least one side hole of one toy is configured to receive the flared rim of the top hole of the other toy, such that when the flared rim of one toy is inserted into the side hole of the other toy, the first toy and the second toy are interlocked; and
wherein the chamber is configured to hold food for the animal, and wherein the top hole of the second toy and the at least one side hole of the first toy are configured to dispense the food when the first toy and the second toy are interlocked.

2. The toy system of claim 1, wherein the retention flaps are deformable.

3. The toy system of claim 1, wherein the first toy or the second toy further comprises a bottom hole directly opposite the top hole on the body.

4. The toy system of claim 1, wherein the flared rim and the body are separated by a passageway.

5. The toy system of claim 4, wherein the passageway of the first toy is configured to provide passage for the food in the chamber of the first toy to enter the chamber of the second toy when the flared rim of the first toy is inserted into the side hole of the second toy.

6. The toy system of claim 4, wherein the passageway of the second toy is configured to dispense the food in the chamber of the second toy when the flared rim of the first toy is inserted into the side hole of the second toy.

7. The toy system of claim 1, either the first toy or the second toy further comprises a nozzle leading from the chamber to the top hole.

8. The toy system of claim 1, wherein the interlocked first and second toys are configured to remain connected until the toys are disconnected by pulling the second toy away from the first toy to remove the flared rim of the first toy from the side hole of the second toy.

9. The toy system of claim 1, wherein the first toy or the second toy comprises more than one side hole.

* * * * *